United States Patent [19]

Engdahl

[11] Patent Number: 4,630,483
[45] Date of Patent: Dec. 23, 1986

[54] PEAK ACCELEROGRAPH

[76] Inventor: Paul D. Engdahl, 2850 Monterey Ave., Costa Mesa, Calif. 92626

[21] Appl. No.: 758,307

[22] Filed: Jul. 24, 1985

[51] Int. Cl.⁴ ............................................. G01D 15/02
[52] U.S. Cl. ........................................... 73/652; 346/7; 346/44; 346/139 C
[58] Field of Search .................... 346/7, 44, 139 C; 200/61.48, 61.49, 61.51; 73/492, 514, 652, 654

[56] References Cited

U.S. PATENT DOCUMENTS

| | | | |
|---|---|---|---|
| 2,393,069 | 1/1946 | Rushing et al. | 346/7 |
| 3,427,635 | 2/1969 | Siegelman et al. | 346/139 C |
| 3,974,504 | 8/1976 | Engdahl | 346/7 |
| 4,223,319 | 9/1980 | Engdahl | 346/7 |

Primary Examiner—Stewart J. Levy
Assistant Examiner—John E. Chapman, Jr.
Attorney, Agent, or Firm—Lawrence Fleming

[57] ABSTRACT

A three-axis scratch-recording accelerograph of the type installed in large structures to record peak magnitudes of earthquake or like motion. Hard styli coupled to seismometer elements scratch or engrave record lines on small stationary metallic record plates, which are suitably coated. No standby power is required and the records are resistant to heat, liquids, and mechanical damage. The instrument embodies various improvements over that in my prior U.S. Pat. No. 3,974,504 respecting the reed spring suspension of the proof mass; transit clamping; the magnifying lever system; and electrical status indication.

8 Claims, 13 Drawing Figures

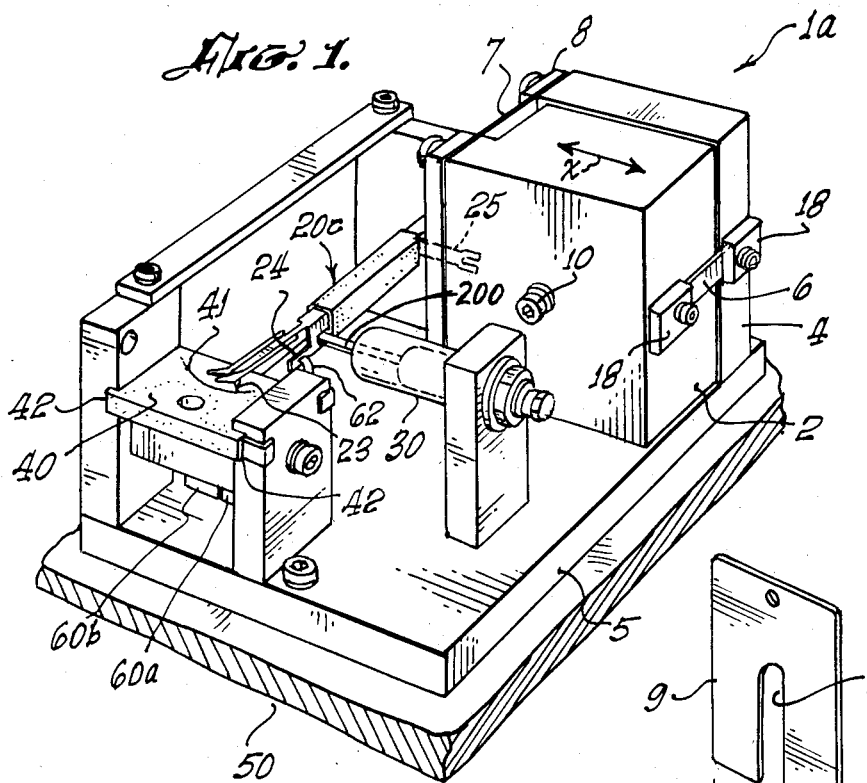

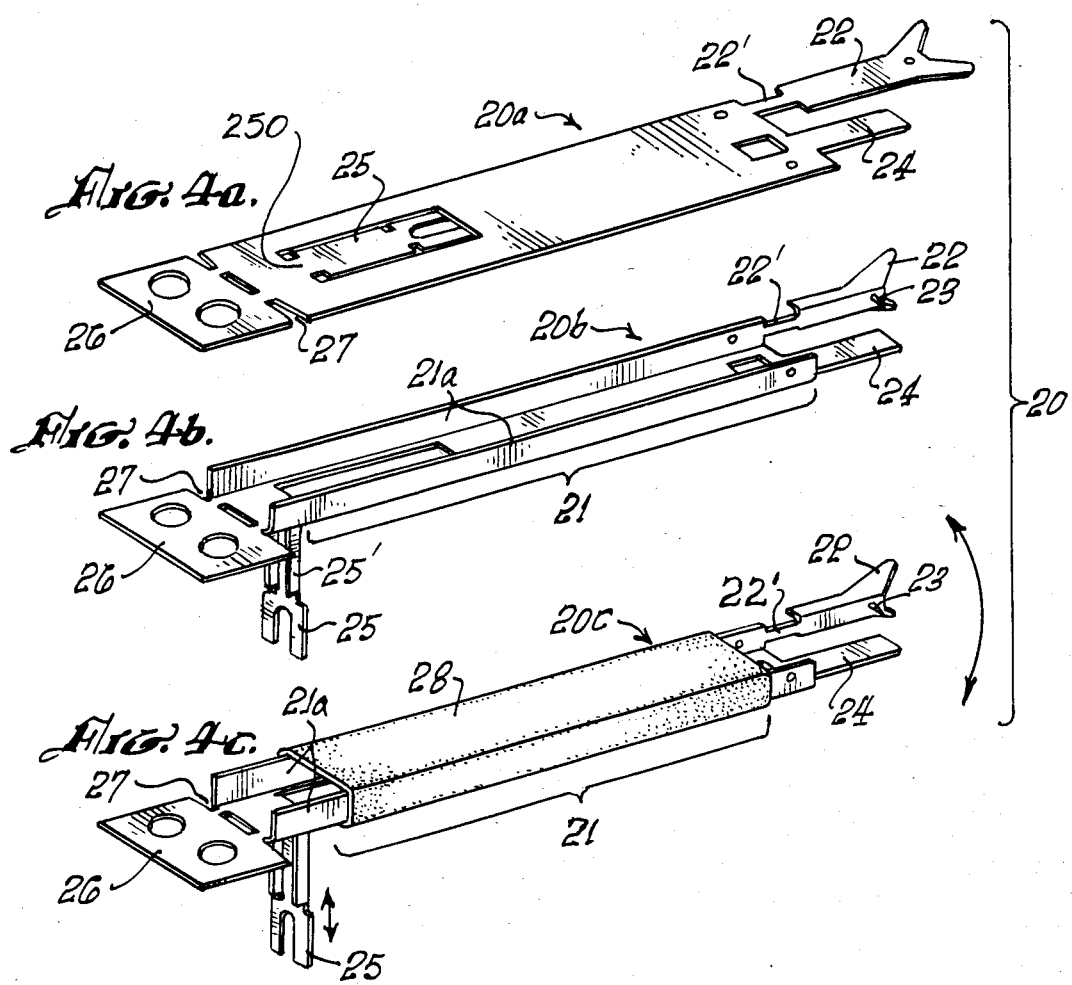
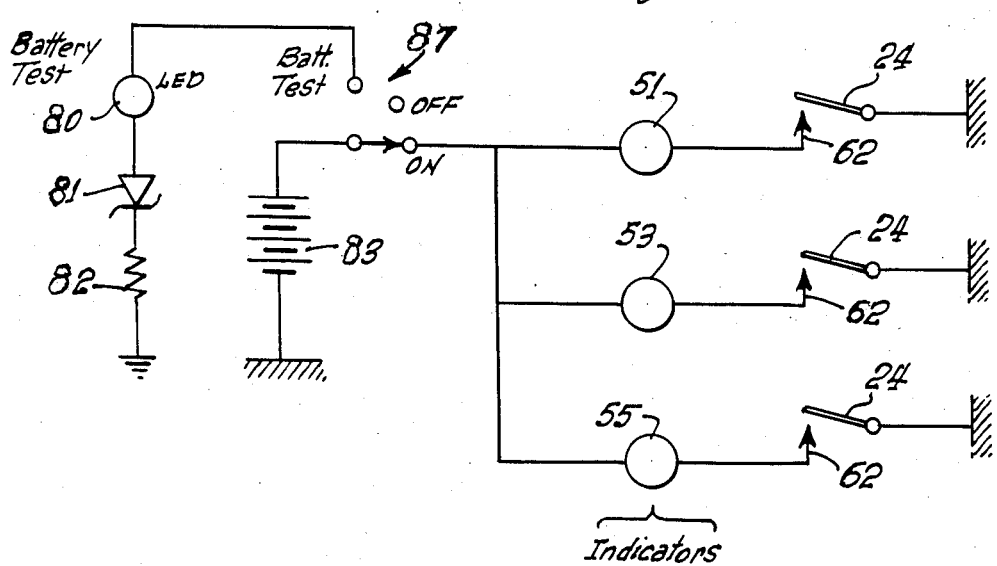

1

PEAK ACCELEROGRAPH

BACKGROUND

Acceleration recorders are installed in structures such as large buildings, power plants, and dams to provide data on motion of the earth as from earthquakes.

In addition to conventional seismograph-type instruments, simpler and more rugged peak accelerographs are employed which record peak values of acceleration as scratches on metal record plates; these instruments require no batteries or other power, and the records survive exposure to strong magnetic fields and to fire and water.

SUMMARY

This invention is a three-axis peak accelerograph of the above type. It is an improvement on the peak accelerograph shown and described in my prior U.S. Pat. No. 3,974,504 of Aug. 10, 1976, which is incorporated herein by reference.

The present invention differs from the above prior one in the following general respects:

(a) the seismic mass or "proof mass" is suspended on three leaf spring elements or reeds, instead of four, and two of them are integral;

(b) a novel transit shim is provided to hold the proof mass stationary during shipping and handling of the instrument;

(c) the stylus-carrying lever arm which mechanically magnifies the displacement of the proof mass is of novel integral lightweight construction;

(d) electrically-operated status indicators, energized via novel lever arm contacts, are provided to indicate when an acceleration greater than some predetermined magnitude has been recorded; and (e) damping is provided, preferably by air dashpots such as are shown in my prior U.S. Pat. No. 4,223,319.

IN THE DRAWING

FIG. 1 is a perspective view of an accelerograph assembly for one axis;

FIG. 2 is a perspective detail of a proof mass and reed suspension assembly showing the transit shim;

FIG. 3 is a section on line 3—3 of FIG. 2;

Figure 5:
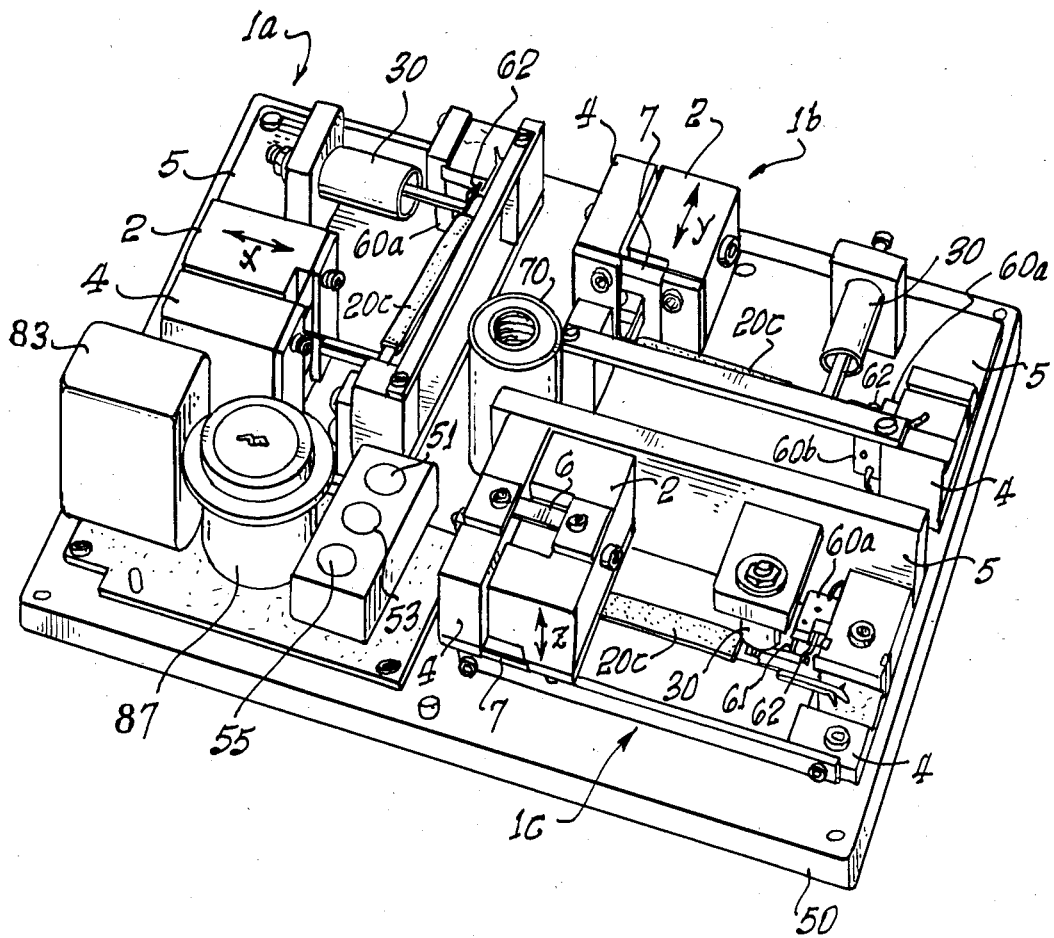
Figure 7:
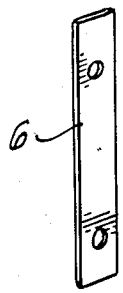
Figure 8:
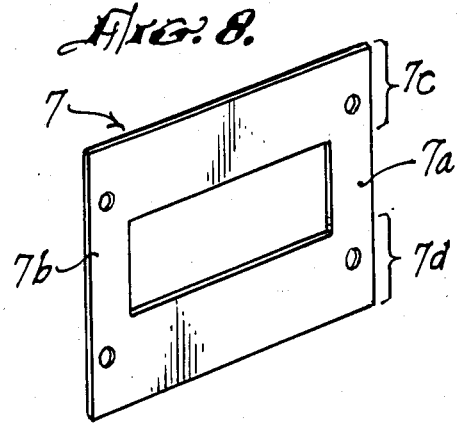
Figure 9:
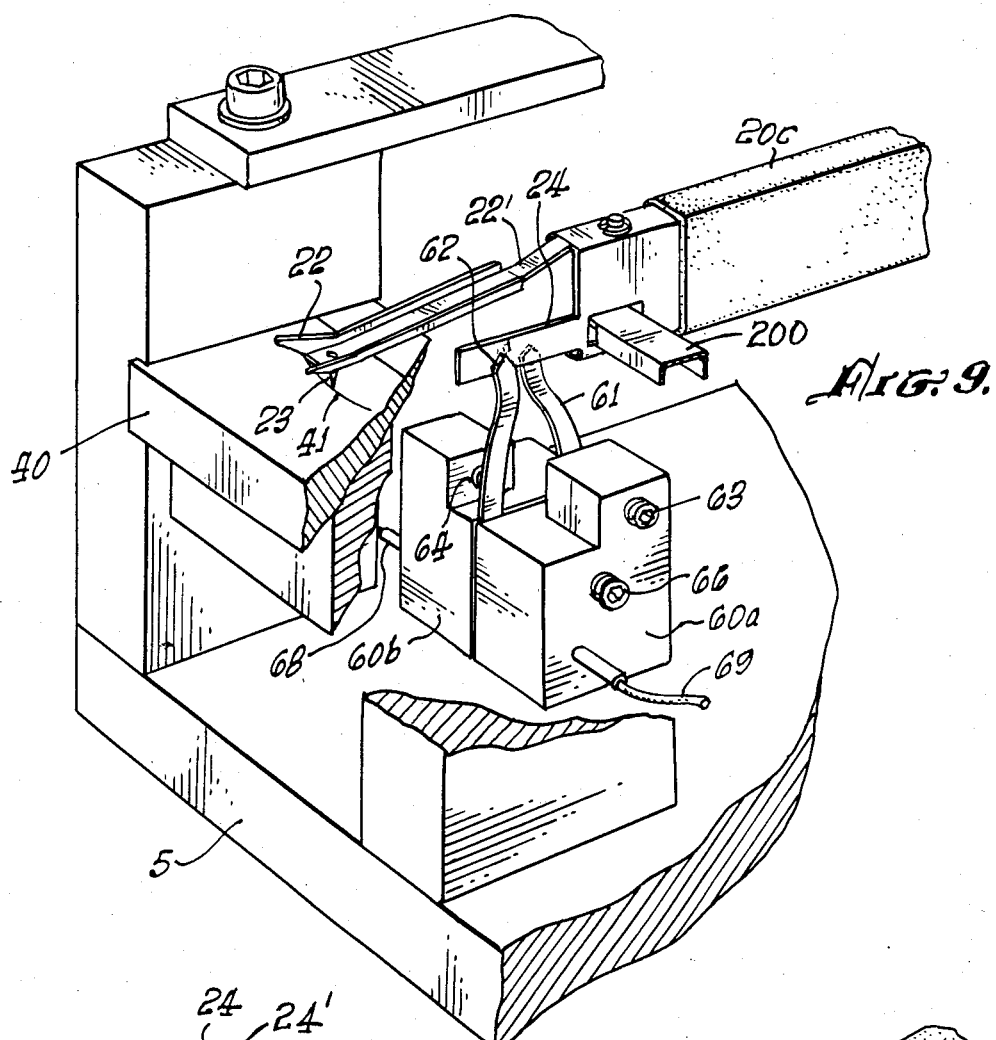
Figure 10:
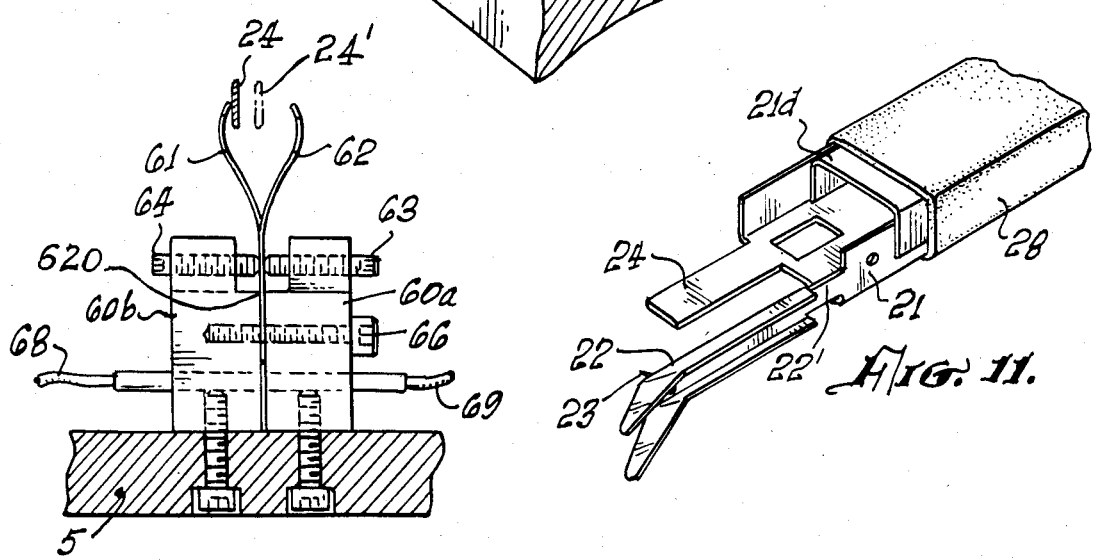

FIGS. 4a, 4b, and 4c are enlarged perspective views of a lever arm and stylus at three stages of its manufacture;

FIG. 5 is a simplified perspective view of a complete three-axis accelerograph;

FIG. 6 is a schematic electrical diagram;

FIGS. 7 and 8 are perspective view of the reed suspension springs;

FIG. 9 is an enlarged partial perspective view showing the arm contacts;

FIG. 10 is an end view of a contact assembly; and

Figure 11:
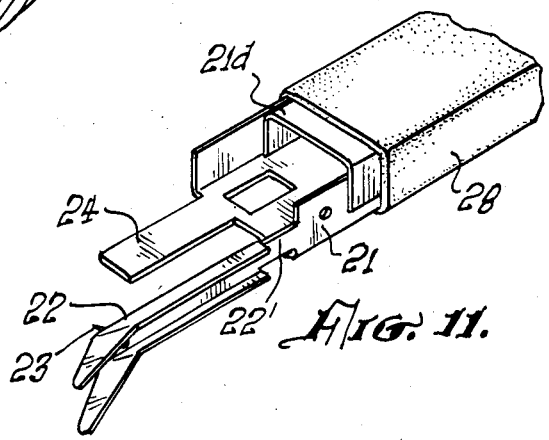

FIG. 11 is a partial perspective view showing an alternative arm construction.

DETAILED DESCRIPTION

Referring first to FIG. 1, a single complete one-axis accelerograph unit is shown. A proof mass 2 is connected to a mounting plate 4 (which is fastened to the base 5 of the instrument) by flat springs or reeds 6, 7. These reeds permit the mass 2 to move back and forth along the direction of the arrow x, i.e., the reeds 6, 7 provide a generally linear compliant constraint. Displacement of mass 2 is multiplied or magnified by a light, stiff lever arm 20c which carries a stylus 23 at its tip portion. Magnification is about 8:1. The stylus 23, preferably made of diamond, is adapted to make a "scratch" trace, indicated at 41, on the suitably-prepared surface of a metallic record plate 40. Plate 40 is replaceable by sliding in and out through slots 42 in the frame structure, as in my prior U.S. Pat. No. 3,974,504. A damping device 30 is connected between arm 20c and a suitable bracket on the frame or base to damp mechanical oscillations at the natural frequency of the mass-spring system 2, 6, 7. The above structure and function, as far as generally described above, is generally similar to that of FIGS. 2, 6, and 9 of my prior U.S. Pat. No. 3,974,504; the above description is included here for clarity. The improvements of the present invention are now described.

In the present invention, the proof mass 2 is suspended and guided by three reeds, instead of four. This ensures that no reeds will be differentially stressed by small relative displacements in the mounting process—as, for example, a three-legged stool cannot teeter, but a four-legged one can.

In FIG. 2, two reeds 7a, 7b support and guide one side of proof mass 2, and a single reed 6 the opposite side. The reeds are secured by shoulder screws 89 and clamping strips 8, 8, 18, FIGS. 2-3. The unthreaded or shoulder portions of these screws 89 serve to align the parts 2, 4, 6, 7, 8, 18 during assembly.

FIG. 7 shows the spring or reed 6 by itself, and FIG. 8 the reed element 7 with flexure portions 7a, 7b. It will be apparent that the latter pair of reeds is part of a single element or piece of sheet spring material 7 shaped generally as a hollow rectangle. This construction simplifies assembly and improves the precision of alignment and placement of the reeds 7a, 7b. The inactive legs 7c, 7d of the rectangular element 7 fit under the clamping strips 8, 8; see FIG. 2.

FIG. 3 shows how the reeds deflect. It will be seen that when mass 2 is deflected along the direction of arrow x, the reeds become slightly S-shaped, and hence the distance between their ends decreases; accordingly, the clearance space c between base plate 4 and mass 2 becomes narrower. A feature of the invention is the filling of this space c by a transit shim 9 to hold proof mass 2 stationary during handling or shipment of the instrument. This shim is removed after the instrument is installed in place. Shim 9 appears in section in FIG. 3 and is shown removed in FIG. 2. The dimensions of the parts are so chosen that shim 9 slips into place easily when proof mass 2 is undeflected (i.e., when reeds 6, 7 are straight), but fits tightly in place when mass 2 is substantially deflected, as indicated in FIG. 3. For transit, the mass 2 is held in its deflected position by tightening locking means shown as the nut 11 on screw 10, FIGS. 2 and 3. In FIG. 2, the slot 19 in shim 9 provides clearance around the screw 10. Stop screws 70, 70, FIG. 3, are provided to limit the deflection of mass 2.

Another feature of the invention is the construction of the motion-multiplying lever arm 20. This arm is shown in its completed form at 20c in FIG. 1, and in three stages of manufacture at 20a, 20b, 20c in FIGS. 4a, 4b, 4c.

Referring now to FIGS. 4a–4c, the arm has a root portion 26 which is clamped to a suitable bracket (not shown) on the frame 5 of the instrument; a hinge portion 27 of reduced width; a push-rod portion 25 which is attached to proof mass 2; an arm portion 21 having flange portions 21a; a stylus carrier portion 22 for stylus 23; and a contact wiper portion 24. Referring back to FIGS. 2 and 3, the driven end of push-rod portion at 25 is attached to proof mass 2 at 29 as by a screw 29a.

Referring back to FIG. 4a, the lever indicated in toto at 20 is preferably made from an etched blank 20a consisting of a single piece of spring metal, such as beryllium copper, about 0.08 mm (0.0033 inch) thick. Referring to FIG. 4b, the sides of the blank are bent upward at 21a, 21a to provide a channel-shaped cross section relatively stiff in bending. The push-rod portion at 25 is bent down, and its sides similarly bent up at 25' to provide a stiff channel-shaped section. At the opposite or outer end of the arm 20, the stylus holder portion 22 is bent to shape as shown, and stylus 23 cemented in place. The arm structure 20b of FIG. 4b is now flexible where needed, i.e., at hinge portion 27, at the base of push-rod portion 25 (at 250, FIG. 4a), and at the base 22' of stylus carrier 22; while it is relatively rigid in bending along the lengths of the arm at 21, the push-rod at 25', and the body of stylus carrier 22. The main arm section 21 is not, however, stiff enough in torsion for satisfactory operation.

The torsional stiffness is hence increased to a satisfactory value by enclosing the main arm portion in a tight-fitting jacket 28. This may conveniently be a length of heat-shrinkable plastic tubing, such as is used in electrical wiring. The arm structure 20c is now complete.

FIG. 11 shows an alternative construction of the arm for more torsional stiffness. Here, the arm 21 is made as before, but an additional channel member 21d is laid along it to form a box section. The two channel members 21, 21d are held together by shrinkable tubing 28.

Referring to FIGS. 1 and 5, the damping device 30 is preferably an air dashpot of known type, connected to arm 20c by a suitable connecting member 200. See also FIG. 9. Such a dashpot is shown in FIGS. 7, 9, 11, and 13 of my prior U.S. Pat. No. 4,223,319. The cylinder is preferably of glass, the piston of graphite.

Referring now particularly to FIGS. 9-10, resilient contact members 61 and 62 are provided which make electrical contact with contact wiper arm element 24 on arm 20c when the arm deflects to one side or the other of a predetermined center or rest position by a predetermined adjustable amount. These members 61, 62 are shaped generally as bent cantilever springs of thin metal, anchored in a suitable block-like base 60a, 60b. The tip portions of these contact members 61, 62 are normally a small distance apart so that wiper 24 touches neither one when arm 20c is in its center or undeflected position. In FIG. 10, wiper 24 is shown deflected and contacting member 61; the wiper 24 in center position is indicated in dotted lines at 24'.

Contact spring members 61, 62 are made compliant enough so that they do not add appreciably to the stiffness of the mass-spring systems 2, 6, 7, as seen at the stylus 23, i.e., they do not appreciably reduce the deflection of arm 20c in response to acceleration, but ride along with it. They may be of 0.02 mm beryllium copper.

Adjusting means, as screws 63, 64, are provided to adjust the rest or noncontacting positions of contact members 61, 62 to determine the width and position of the "dead zone" wherein wiper 24 makes no contact. See FIG. 10.

A feature of the invention is that each adjusting screw is disposed so as, when screwed inward, to move its contact member away from the center zone, rather than toward it. Thus, screw 63 pushes member 61 away from center (to the left in FIG. 10); and screw 64 pushes member 62 to the right. The advantage of this "crossed" structure is that when wiper 24 engages a contact member 61 or 62, it pushes it away from its adjusting screw; thus, at larger deflections, the effective length of the cantilever member 61 or 62 becomes longer, extending past the screw down to the clamping point at its root, indicated at 620, FIG. 10. Hence, at higher deflections, the stiffness of cantilever members 61, 62 is relatively reduced, which desirably reduces their loading effect on the properties of the seismic systems 2, 6, 7, 20c, etc.

The mounting blocks 60a, 60b are suitably held together by a screw 66; members 61, 62 being suitably clamped between these blocks. Wires 68, 69 make electrical contact with the members 61, 62.

Referring now to FIG. 5, the contacts 61, 62 on the three orthogonally-mounted accelerograph assemblies or units 1a, 1b, 1c may operate event recorders of known kind, indicated at 51, 53, 55. See also FIG. 6. These, once actuated, maintain their indications until manually or electrically reset. They are binary indicators, i.e., indicate solely "have been actuated" or "have not". FIG. 6 indicates a suitable circuit. A key-operated switch 87 has "off", "battery test", and "on" positions; a battery 83 supplies power for the event recorders; a suitable battery test circuit with a light-emitting diode is indicated at 80, 81, 82. Arm contacts are indicated at 62, contacts 61 being omitted for simplicity.

FIG. 5 shows the complete three-axis instrument. Accelerograph assemblies 1a, 1b, 1c are oriented to respond to accelerations in the X-, Y-, and Z-directions, respectively. Post 70 is for attaching a cover.

In installing the instrument, it is mounted in place with the cover removed, and the nuts 11 (FIGS. 2-3) then loosened and the transit shims 9 removed. The event recorders are set to "nonactuated", and the record plates 40 inserted into their slots. The cover is then replaced.

Specifications of a production instrument, according to the invention, include the following:
Natural frequency: 40 Hz
Bandwidth: 0 to 32 Hz
Full scale acceleration: 2.5 g
Damping: 55 to 70% of critical
Dynamic range: 100:1
Accuracy (full scale): 5%
Cross-axis sensitivity: 0.03 g/g max.

I claim:
1. A peak accelerograph comprising an accelerograph element having
   a base member and a proof mass each having generally parallel facing surfaces defining a clearance space therebetween,
   parallel flat spring reeds connecting said base member and said mass to permit relative parallel oscillatory displacement therebetween,
   said reeds being three in number;
   a displacement-magnifying lever arm having a root portion, a push-rod portion, an arm portion, and a stylus-carrier portion;
   a connection from said root portion to said base member and a connection from said push rod portion to said proof mass,
   all said portions being integral parts of a single bent piece of sheet material,
   said arm and push-rod portions having channel-shaped cross sections.

2. A peak accelerograph as in claim 1 wherein:
two of said reeds are parallel opposite legs of a flat hollow rectangular element made of a single flat piece of sheet spring material.

3. A peak accelerograph as in claim 1 further comprising:
a transit shim of dimensions to fit tightly in said clearance space when said reeds are substantially deflected but to be withdrawable when said reeds are undeflected, and
locking means to lock said proof mass in a said deflected position to retain said shim during shipment of said accelerograph.

4. A peak accelerograph as in claim 3 further comprising a tight tubular covering over said arm portion to increase its torsional stiffness.

5. A peak accelerograph as in claim 4 wherein said covering is a length of heat-shrinkable plastic tubing shrunk in place.

6. A peak accelerograph as in claim 5 further comprising:
a reinforcing channel similar to said arm portion and disposed in contact with it to form a reinforced arm member of generally hollow rectangular cross section,
said reinforcing channel and arm portion being held together by said tubing.

7. A peak accelerograph as in claim 3 further comprising:
a contact wiper portion on said arm near said stylus;
a pair of light resilient contact members shaped generally as bent cantilever springs and having their root portions secured to said base member,
the free end portions of said contact members being separated, and disposed to be contacted by said wiper portion throughout deflections of said arm greater than a predetermined distance from a central position; and
an adjusting means for each said contact member disposed to push it away from said central position,
said contact members being thereby moved free of their adjusting means during said deflections.

8. A peak accelerograph as in claim 7 wherein:
said accelerograph elements are three in number and disposed to respond to accelerations along three mutually perpendicular axes, and further comprising:
event recorders connected for actuation by contact between said contact wiper portions and said contact members.

* * * * *